United States Patent
De Jager et al.

(10) Patent No.: US 6,188,149 B1
(45) Date of Patent: *Feb. 13, 2001

(54) LINEAR MOTOR FOR A TEXTILE MACHINE AS WELL AS AN APPARATUS WITH A LINEAR MOTOR AND A WEAVING MACHINE WITH AN APPARATUS

(75) Inventors: Godert De Jager, Volketswil; Dietmar Markward, Rüti, both of (CH)

(73) Assignee: Sulzer Rueti AG, Rueti (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/316,967

(22) Filed: May 24, 1999

(30) Foreign Application Priority Data

May 28, 1998 (EP) .................................. 98810495

(51) Int. Cl.[7] .......................... H02K 41/00; H02K 33/00; H01R 39/00; B65H 59/22

(52) U.S. Cl. ................................ 310/12; 310/29; 310/36; 310/219; 242/150 R

(58) Field of Search ................................ 310/12, 13, 14, 310/15, 20, 21, 27, 28, 29, 30, 36, 37, 38, 332, 219; 139/455, 452; 242/150 M, 150 R, 149, 365.4; 28/194; 66/146

(56) References Cited

U.S. PATENT DOCUMENTS

| | | | |
|---|---|---|---|
| 3,624,896 | * 12/1971 | Daubeney et al. | 310/13 |
| 3,991,954 | * 11/1976 | Schwartz | 242/150 M |
| 4,169,234 | 9/1979 | Yonkers | 310/29 |
| 4,351,596 | * 9/1982 | Ohniwa et al. | 396/463 |
| 4,442,367 | * 4/1984 | Suzuki | 310/91 |
| 4,786,834 | * 11/1988 | Grant et al. | 310/194 |
| 4,875,347 | * 10/1989 | Vermot-Gaud et al. | 66/219 |
| 4,945,269 | * 7/1990 | Kamm | 310/15 |
| 4,998,420 | * 3/1991 | Scavino | 66/138 |
| 5,255,521 | * 10/1993 | Watanabe | 62/6 |
| 5,293,290 | 3/1994 | Owens | 360/106 |
| 5,343,899 | 9/1994 | Jacobsson | 139/452 |
| 5,560,557 | * 10/1996 | Horvath et al. | 242/149 |
| 5,682,132 | * 10/1997 | Hiroyoshi et al. | 340/407.1 |
| 5,920,140 | * 7/1999 | Nakagishi et al. | 310/219 |

FOREIGN PATENT DOCUMENTS

| | | |
|---|---|---|
| 962185 | 4/1957 | (DE) . |
| 0117520A2 | 9/1984 | (EP) . |
| 2142366 | 1/1973 | (FR) . |

OTHER PUBLICATIONS

Chetwynd, D.G., "Linear translation mechanisms for nano-technology applications", *Measurement+Control*, vol. 24, (1991) Mar., No. 2, London, GB.

Patent Abstracts of Japan, vol. 8, No. 243 (E–277) 1680!, Nov. 8, 1984 & JP 59 122359 A (Yoshiteru Takahashi), Jul. 14, 1984, Abstract.

Patent Abstracts of Japan, vol. 9, No. 169 (E–328) '1892!', Jul. 13, 1985, & JP 60 043062A (Sankiyou Seiki Seisakusho K.K.), Mar. 7, 1985; Abstract.

\* cited by examiner

*Primary Examiner*—Nestor Ramirez
*Assistant Examiner*—Dang Dinh Le
(74) *Attorney, Agent, or Firm*—Townsend and Townsend and Crew LLP

(57) ABSTRACT

A linear motor for controlling motions of thread being woven on a weaving machine is disclosed. The linear motor contains a stator (1) which produces a magnetic field, an armature (2) which is arranged in the magnetic field, and two flexible mounting parts (3) which are arranged parallel to one another in such a manner that the armature which is connected to the mounting parts is movable relative to the stator. The linear motor drives a member that can contact the thread and thereby influence its motion.

16 Claims, 7 Drawing Sheets

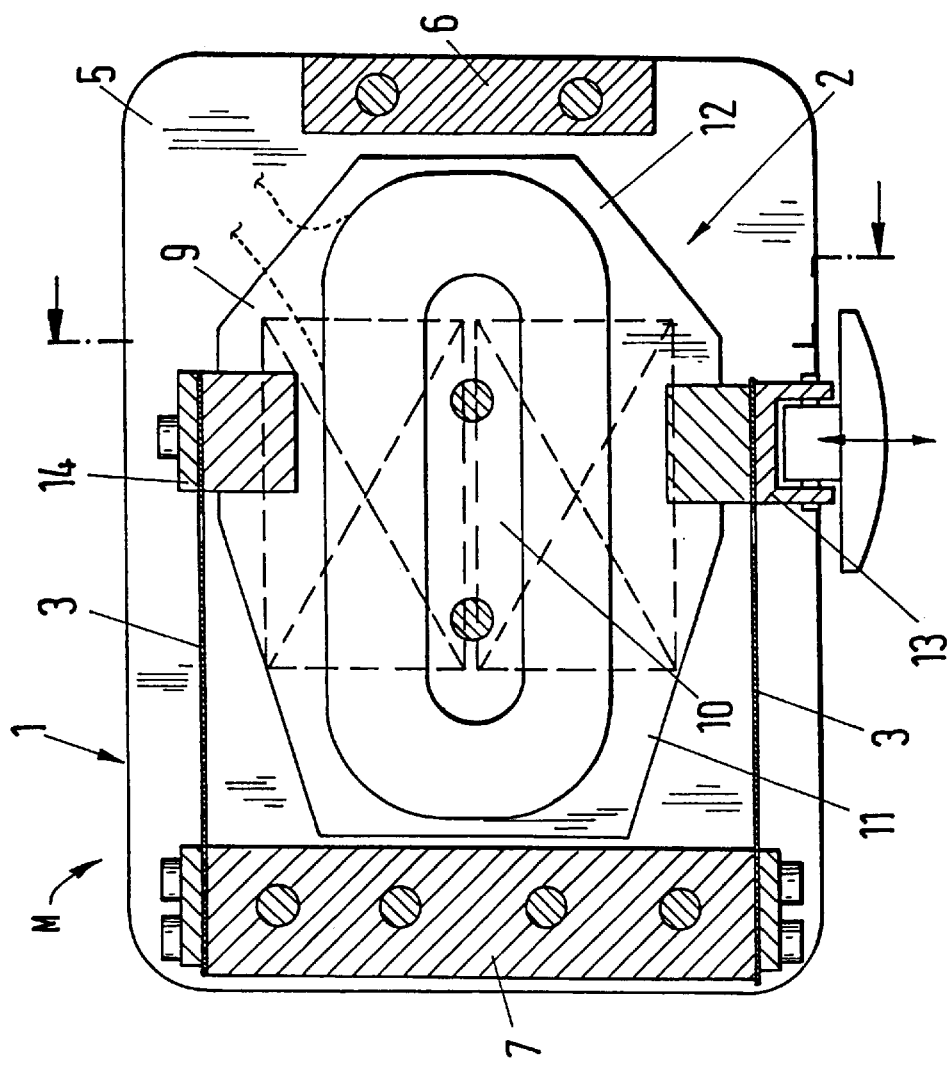
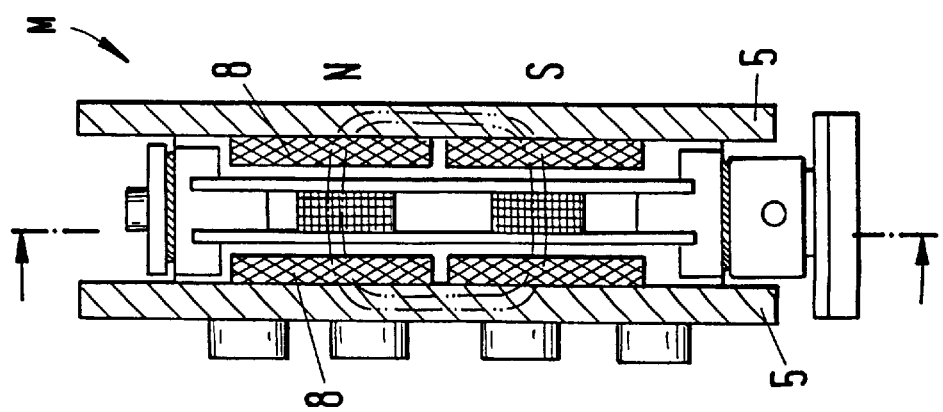

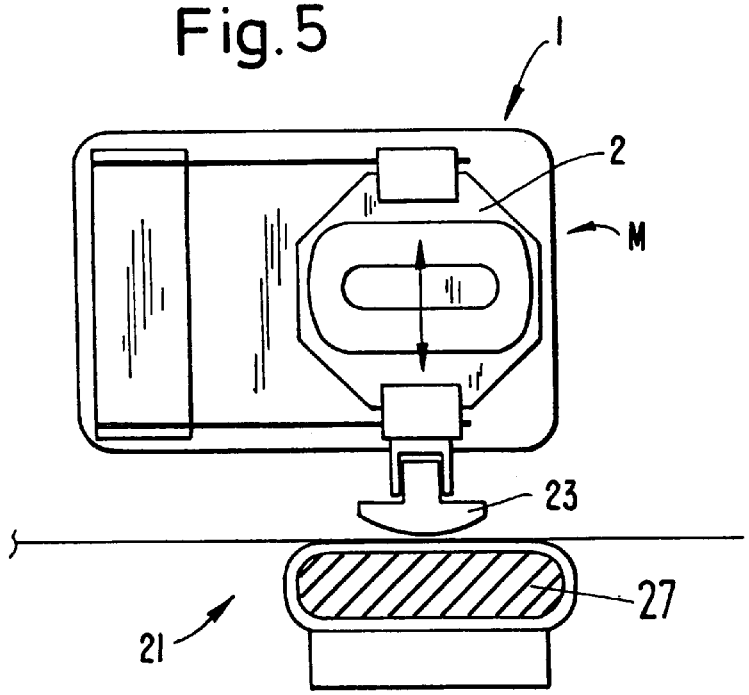
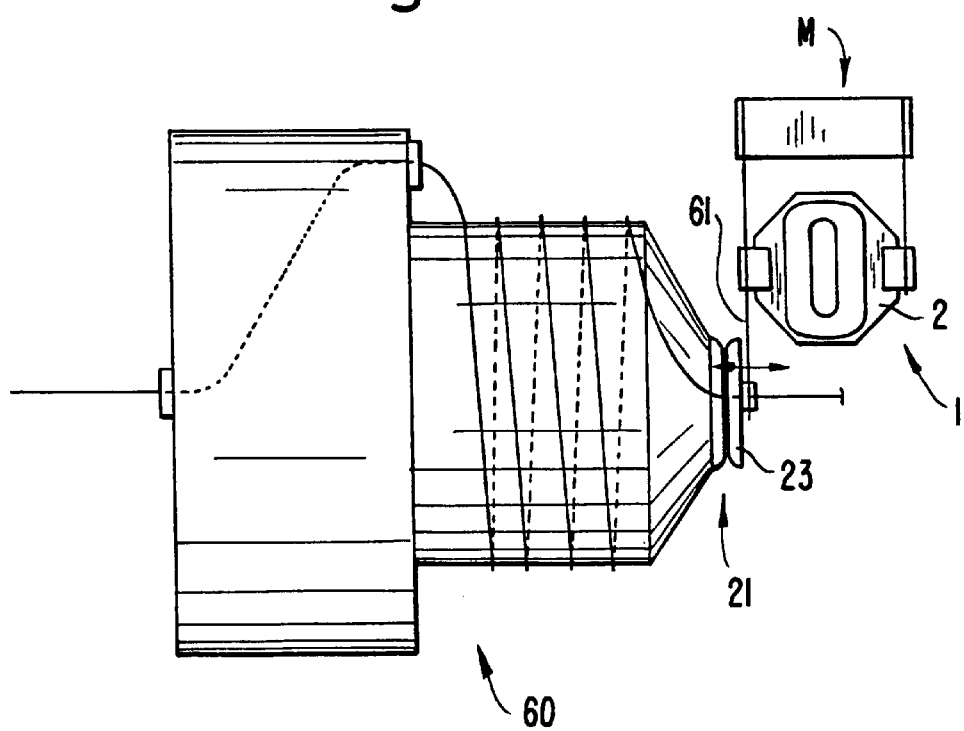

Fig. 13
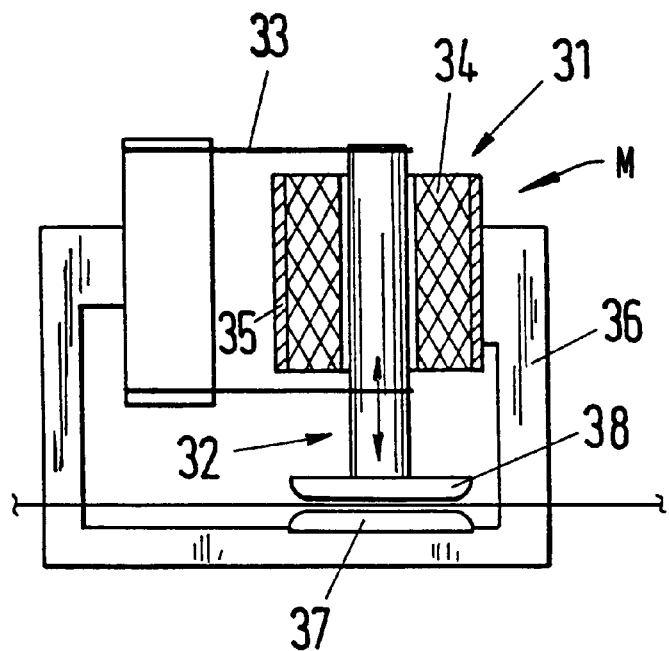
Fig. 14
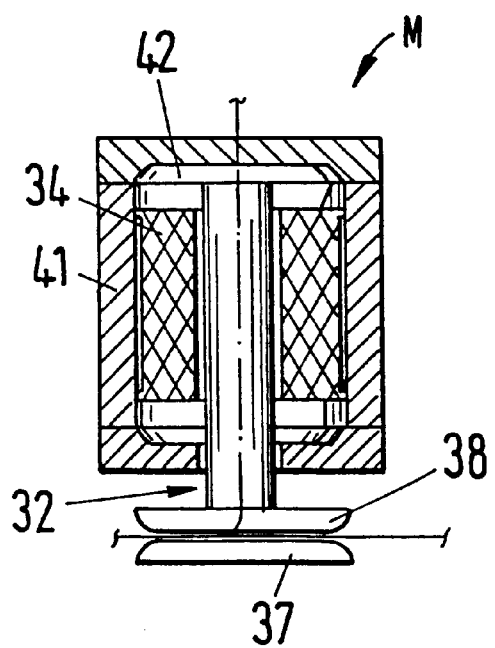
Fig. 15

LINEAR MOTOR FOR A TEXTILE MACHINE AS WELL AS AN APPARATUS WITH A LINEAR MOTOR AND A WEAVING MACHINE WITH AN APPARATUS

BACKGROUND OF THE INVENTION

The invention relates to a linear motor for a textile machine, an apparatus for influencing a sequence of movement of a thread using a linear motor, and a weaving machine with an apparatus of this kind.

A linear motor for a weaving machine is described in U.S. Pat. No. 4,998,420 which has a stator with a ferromagnetic plate and a permanent magnet with different polarity as well as an armature with a winding. The stator is arranged at a fixed location and the armature is rotatably journalled on an axis of fixed location.

In this embodiment of the linear motor, the bearing friction which arises and also the bearing clearance prove to be disadvantageous.

SUMMARY OF THE INVENTION

The object of the invention is to improve a linear motor.

The advantages which can be achieved with the invention are substantially to be seen in that the armature executes a movement in a plane; in that the movement is hysteresis-free and is absolutely free of clearance in the mountings; and in that the force which is exerted by the armature is directly proportional to the current strength.

The side walls of the coil body can be provided at the outer side with a copper layer or be manufactured of aluminum. This has the advantage that the permanent magnet, i.e. the magnet pair, produces eddy currents in the copper layer which damp the movement of the armature.

A weaving machine with an apparatus for influencing of the movement sequence of at least one thread or band using a linear motor is characterized in that the apparatus is arranged in the path of travel of the weft thread as a thread brake.

BRIEF DESCRIPTION OF THE DRAWINGS

The invention will be described in the following with reference to the accompanying drawings.

FIGS. 1 and 2 show an embodiment of a linear motor in accordance with the invention in section;

FIG. 5 schematically illustrates a second embodiment of the apparatus in accordance with the invention;

FIG. 12 schematically illustrates an eighth embodiment of the apparatus;

FIG. 13 shows a third embodiment of a linear motor in accordance with the invention as a part of a thread brake in section;

FIG. 14 shows a fourth embodiment of a linear motor in accordance with the invention as a part of a thread brake in section;

FIG. 15 shows an embodiment of a spring in the linear motor in accordance with FIG. 14;

DESCRIPTION OF THE PREFERRED EMBODIMENTS

Figure 4:
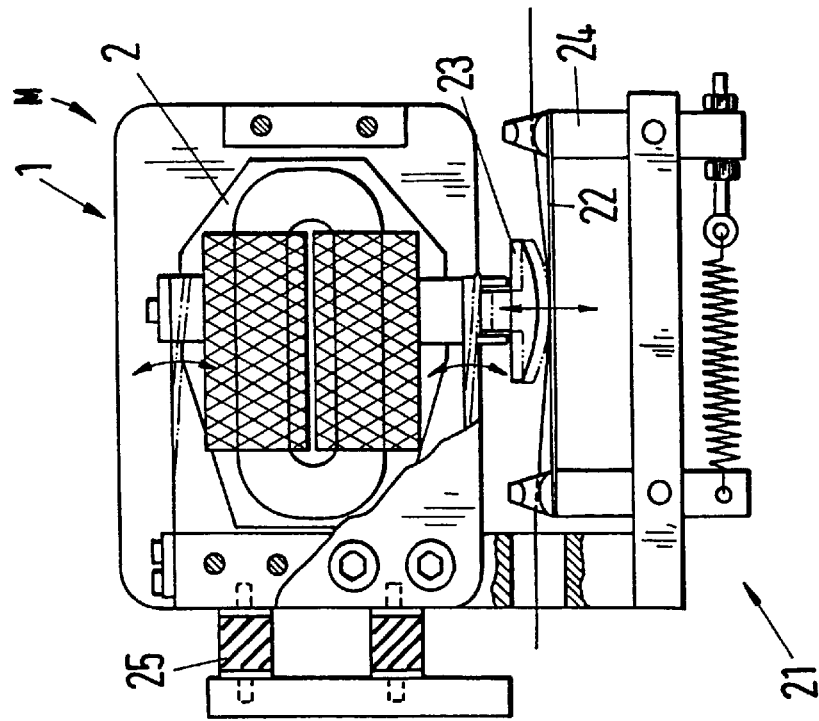
FIG. 4 shows a first embodiment of an apparatus in accordance with the invention.

Reference is made to FIGS. 1 and 2. The linear motor M has a stator 1, an armature 2 and two leaf springs 3 which serve as mountings parts for the armature. The stator contains two plates 5 of ferromagnetic material, two spacers 6, 7 which connect the plates and hold them at a spacing, and two permanent magnet pairs 8 with different polarity which are mounted at the inner side of the plates. The armature 2 contains a coil body 9 with a core 10 and two side walls 11 of a non-ferromagnetic material, e.g. plastic, a coil 12 as well as a first connection member 13 and a second connection member 14. The side walls 11 of the coil body are provided with a copper layer or are manufactured of aluminum. The leaf springs 3 are in each case mounted at the spacer 7 at one end and at the connection member 13, 14 at the other end. The leaf springs 3 have non-illustrated connections for the current supply and are connected to the connection wires of the coil. A reliable current supply to the coil is ensured with this arrangement. In the previously described embodiment the linear motor is arranged between the mountings 3. It is however also possible to arrange the linear motor outside the bearing parts.

The method of functioning of a linear motor is known and will thus not be explained in further detail. When the coil is excited the armature 2 is deflected, with the armature 2 executing a movement in a plane as a result of the leaf springs 3. Since the side walls of the coil body are provided with e.g. a copper layer at the outer surfaces which lie opposite to the permanent magnet pairs, eddy currents are induced in the copper layer during the operation which damp the movement of the armature 2.

Through the parallel orientation of the bearing parts with respect to one another it is possible to provide an extremely small air gap between the armature and the stator. An absolutely clearance-free or play-free mounting results in that leaf springs are used which are firmly anchored at one side.

Figure 3:
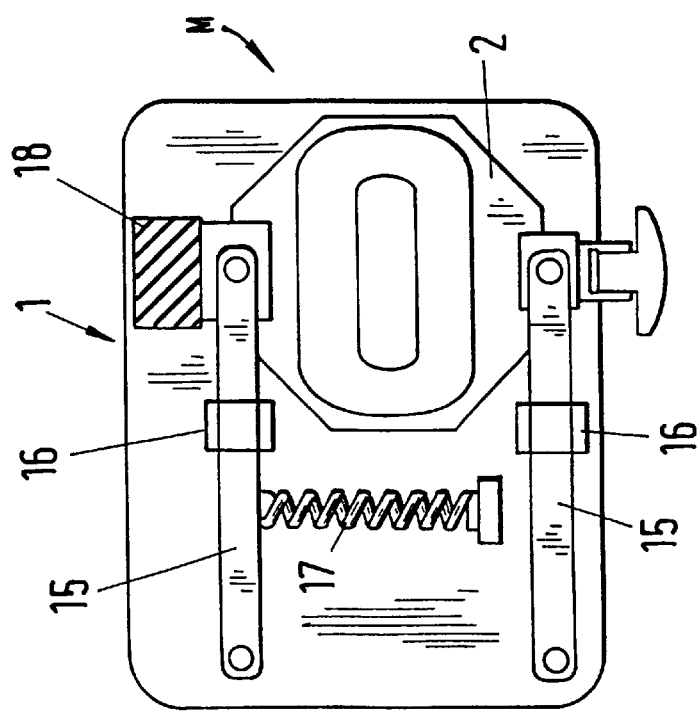
FIG. 3 is a schematic illustration of a second embodiment of a linear motor.

FIG. 3 shows another embodiment of a linear motor M. In this motor the armature 2 is mounted by means of links 15 at the stator 1. A guide part 16 is arranged at each of the levers in order to guide the armature 2 without clearance at the parallel oriented plates of the stator during the movement. A spring 17 can be provided in order to return the armature 2 into the basic position in a switched off or pole-reversed motor respectively and an elastic part 18 can be provided in order to achieve a damping through a softer abutment.

FIG. 4 shows a thread brake 21 with a linear motor M. The thread brake contains a stationary braking part 22 and a movable braking body 23. The stationary braking part 22 is formed as a braking band and is arranged yieldingly in holders 24. The movable braking body 23 is connected to the armature 2. The thread brake is connected to the linear motor and is mounted at a weaving machine by means of elastic elements 25 in order to damp the oscillations arising at the machine frame.

In the embodiment of the thread brake operated with linear motor M and shown in FIG. 5, an elastic body 27 is mounted at the stationary braking part in order to achieve a progressive spring suspension.

Figure 6:
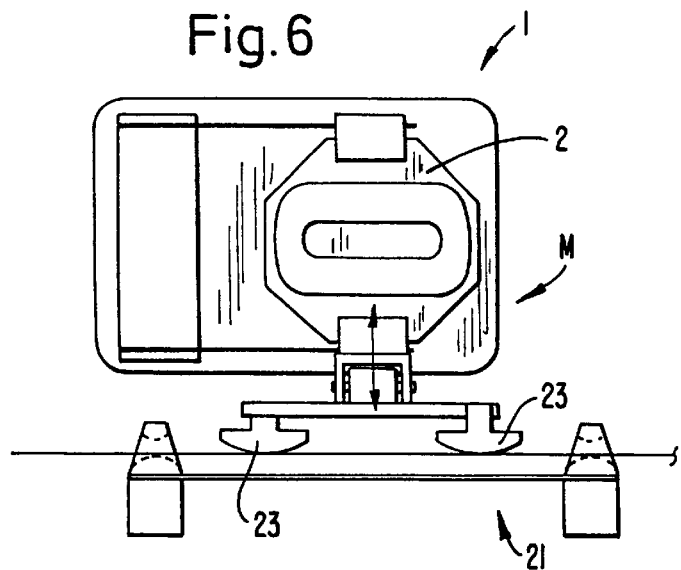
FIG. 6 schematically illustrates a third embodiment of the apparatus.

FIG. 6 shows an embodiment of a thread brake operated with linear motor M which has two braking bodies, so that a thread is braked at two locations. On the one hand an amplification of the braking action on the thread can be achieved thereby; on the other hand the specific braking stress can be distributed over the thread.

Figure 7:
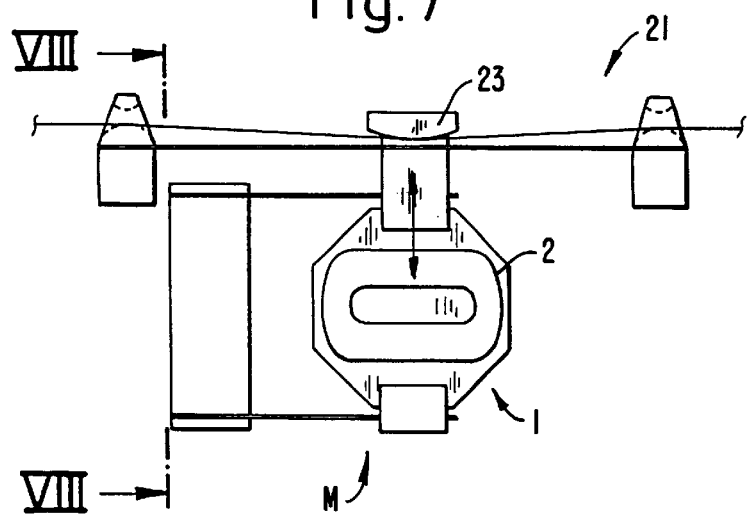
FIG. 7 schematically illustrates a fourth embodiment of the apparatus.
Figure 8:
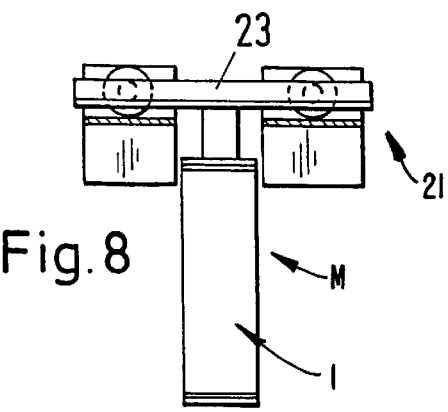
FIG. 8 is a section along the line VIII—VIII in FIG. 7.
Figure 9:
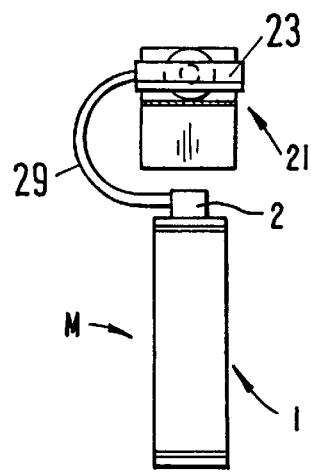
FIG. 9 schematically illustrates a fifth embodiment of the apparatus.

Reference is made to FIGS. 7 to 9. FIGS. 7 and 8 show a thread brake for two threads extending in parallel with however only one linear motor M, with the braking body 23 being formed in the shape of a T and acting on the thread brakes which are arranged thereunder and are oriented in parallel. FIG. 9 shows a thread brake for a thread, with the braking body being formed in the shape of a hook in order to direct the braking force symmetrically onto the braking part. In order to facilitate the introduction of a thread into the thread brake, the linear motor M is arranged beneath the braking band in these embodiments. The braking body is connected to the armature of the linear motor by means of a bow 29.

Figure 10:
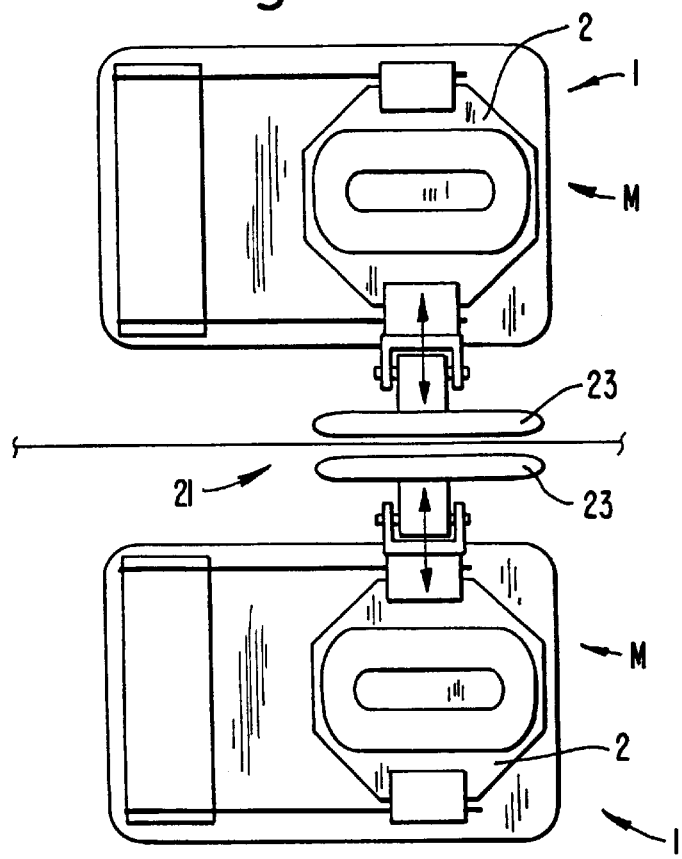
FIG. 10 schematically illustrates a sixth embodiment of the apparatus.
Figure 11:
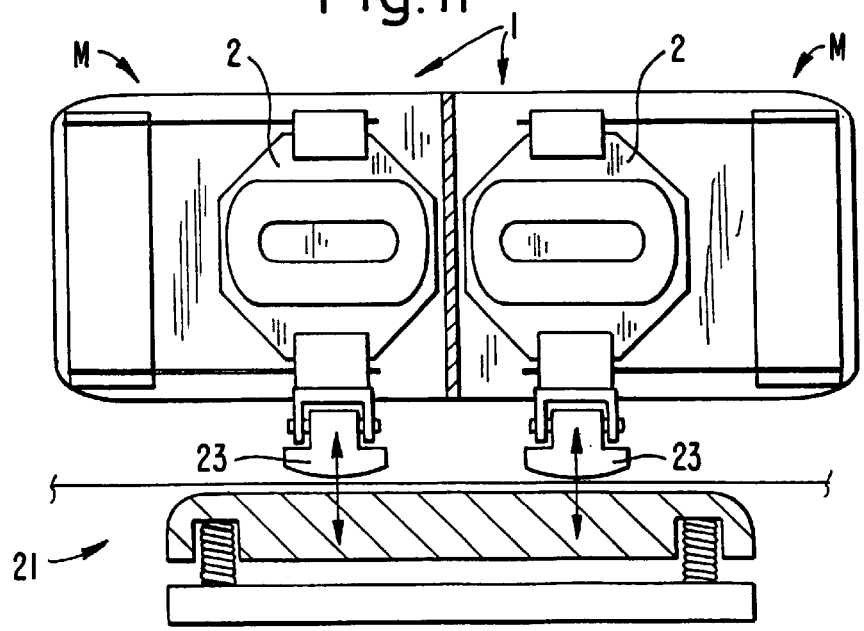
FIG. 11 schematically illustrates a seventh embodiment of the apparatus.

FIGS. 10 to 11 show embodiments of thread brakes with two linear motors M in each case which can be controlled independently of one another. With these embodiments there result further possibilities for, on the one hand, a braking force amplification and, on the other hand, a division of the specific braking stress over the thread. Furthermore, the reaction times for e.g. pair-wise braking of the thread travel can be shortened through alternate loading.

FIG. 12 shows a use of the linear motor M in connection with a known plate thread brake which is arranged at the thread draw-off side of a thread storage 60. In this the movable brake plate 23 is mounted at an extended mounting part 61 of the linear motor.

Reference is made to FIGS. 13 to 15. FIG. 13 shows a linear motor M which contains a stator 31, an armature 32 and two mounting parts 33. The stator contains a coil 34 which is provided in a housing 35. The armature 32 is a permanent magnet which is mounted on the mounting parts 33. The mounting parts are designed as leaf springs. This linear motor is illustrated as a part of a thread brake, which furthermore has a holder 36, a stationary braking part 37 and a braking body 38. The linear motor and the stationary braking part are arranged on the holder and the braking body is mounted on the armature.

FIG. 14 shows a fourth embodiment of a linear motor M which is designed substantially similarly to the linear motor in accordance with FIG. 13.

The essential difference consists in the design of the housing 41 and of the mounting parts 42 (FIG. 15). In this embodiment the mounting parts are designed as ring springs and e.g. at the same time designed as current connection conductors for the coil. The thread to be braked can be conducted through between the braking members 37, 38 in the form illustrated in a solid line, or else radially up to the center of the latter in order to be guided through a non-illustrated central bore.

Figure 16:
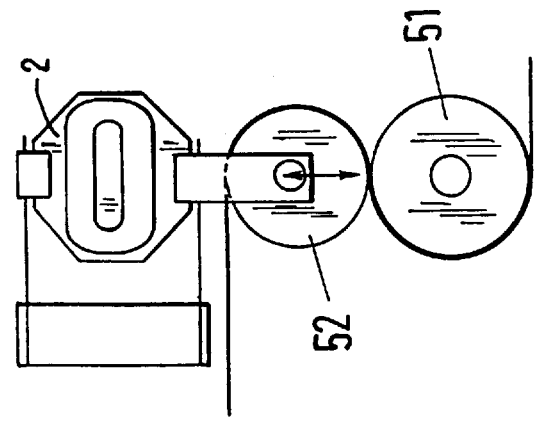
FIG. 16 schematically illustrates a tenth embodiment of the apparatus.

Reference is made to FIGS. 16 to 19. FIG. 16 shows an apparatus for the controllable forwarding of a thread or band using a linear motor M. The apparatus contains a forwarding roller 51 which is set into rotation by a non-illustrated drive and a pressing roller 52 which is connected to the linear motor, whereby movement is produced by friction. In this apparatus a single deflection can be used instead of a double deflection.

Figure 17:
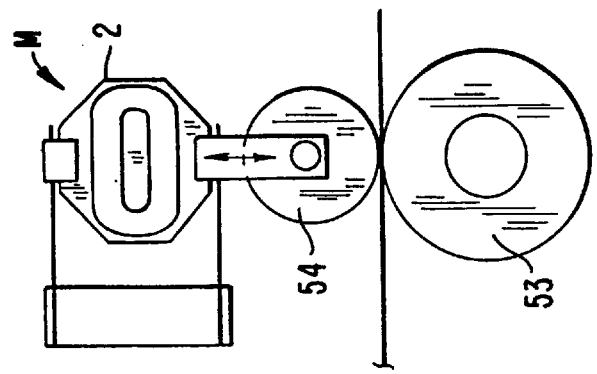
FIG. 17 schematically illustrates an eleventh embodiment of the apparatus.

FIG. 17 shows an apparatus for the acceleration of a thread using a linear motor. This apparatus contains a forwarding roller 53 which is driven by a motor (not shown) and a preferably likewise driven pressing roller 54 which is connected to the linear motor. This apparatus can e.g. be used for the acceleration of a weft thread for the purpose of avoiding the so-called stretch jolt during weft insertion in a projectile weaving machine as well as to assist the weft insertion in air-jet weaving machines.

Figure 18:
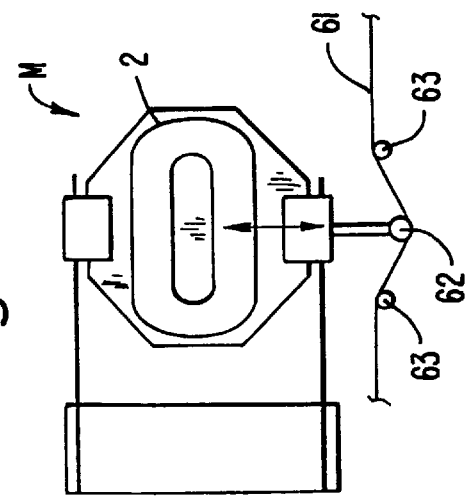
FIG. 18 schematically illustrates a twelfth embodiment of the apparatus.

FIG. 18 shows an apparatus for the deflection of a thread in order e.g. to achieve a controllable damping at the end of a weft insertion in e.g. airjet weaving machines. As is well known to and commonly practiced by those skilled in the art, a thread 61 can be contacted by a deflection member 62 which can engage and deflect the thread between two spaced-apart pins 63.

The linear motor contains a stator 1 which produces a magnetic field, an armature 2 which is arranged in the magnetic field, and two flexible mounting parts 3 which are arranged parallel to one another in such a manner that the armature which is connected to the mounting parts is movable relative to the stator.

What is claimed is:

1. Apparatus for influencing movement of at least one thread comprising a linear motor including a stator for producing a magnetic field, an armature arranged in the magnetic field, first and second flexible mounting parts for mounting the armature and arranged parallel to one another in such a manner that the armature is movable relative to the stator, the mounting parts having elongated leaf springs each including a first end connected to the stator and a second end connected to the armature, the stator having first and second plates made of ferromagnetic material which are spaced apart and arranged parallel to each other, the armature being arranged between the first and second plates and the first and second plates being spaced with respect to the armature, the armature having a coil body with a core, side walls and a coil, at least one of the core and the side walls consisting of non-ferromagnetic material, wherein the leaf springs extend in the direction of the first and second plates, and the armature is arranged so as to be mounted without clearance and movable in the direction of the first and second plates, and at least one first member connected to the armature so that the first member can act on the thread to thereby influence the movement of the at least one thread.

2. Apparatus in accordance with claim 1 including a permanent magnet arranged at least at one of the first and second plates.

3. Apparatus in accordance with claim 2 including first and second permanent magnets, the first permanent magnet being arranged at the first plate and the second permanent magnet being arranged at the second plate.

4. Apparatus in accordance with claim 1 including a joint connecting the mounting parts to the stator and the armature.

5. Apparatus in accordance with claim 1 wherein the leaf springs are tightly connected to the stator and the armature.

6. Apparatus in accordance with claim 1 including a stationary braking part, the first member and the stationary braking part forming a thread brake.

7. Apparatus in accordance with claim 6 including an elastic body mounted at the stationary braking part for providing a progressive spring suspension.

8. Apparatus in accordance with claim 6 wherein the stationary braking part is arranged between the first member and the linear motor.

9. Apparatus in accordance with claim 8 including a bow connecting the first member to the armature.

10. Apparatus in accordance with claim 1 including two first members connected to the armature.

11. Apparatus in accordance with claim 1 wherein the first member is a plate.

12. Apparatus in accordance with claim 1 wherein two apparatuses are arranged opposite each other.

13. Apparatus in accordance with claim 1 including two linear motors each including a stator and an armature, arranged in line, one beside the other.

14. Apparatus in accordance with claim 1 wherein an outer side of the side walls is provided with one of a copper layer and a coating of a non-ferromagnetic material.

15. Apparatus in accordance with claim 1 wherein the mounting parts supply current to the coil.

16. Apparatus in accordance with claim 1 including means for damping oscillations which are produced.

* * * * *